United States Patent [19]

Talgam et al.

[11] Patent Number: 5,067,078
[45] Date of Patent: Nov. 19, 1991

[54] CACHE WHICH PROVIDES STATUS INFORMATION

[75] Inventors: Yoav Talgam, Tel-Aviv, Israel; James A. Klingshirn; James B. Gullette, both of Austin, Tex.

[73] Assignee: Motorola, Inc., Schaumburg, Ill.

[21] Appl. No.: 339,464

[22] Filed: Apr. 17, 1989

[51] Int. Cl.[5] .......................... G06F 7/00; G06F 7/04; G06F 7/20; G11C 8/00
[52] U.S. Cl. .............................. 395/400; 365/230.01; 365/49
[58] Field of Search ............................ 365/49, 230.01; 364/200

[56] References Cited

U.S. PATENT DOCUMENTS

| | | | |
|---|---|---|---|
| 4,075,686 | 2/1978 | Calle et al. | 364/200 |
| 4,190,885 | 2/1980 | Joyce et al. | 364/200 |
| 4,219,883 | 8/1980 | Kobayashi et al. | 365/189 |
| 4,264,953 | 4/1981 | Douglas et al. | 364/200 |
| 4,357,656 | 11/1982 | Saltz et al. | 364/200 |
| 4,464,717 | 8/1984 | Keeley et al. | 364/200 |
| 4,819,154 | 4/1989 | Stiffler et al. | 364/200 |
| 4,953,073 | 8/1990 | Moussouris et al. | 364/200 |

Primary Examiner—Alyssa H. Bowler
Attorney, Agent, or Firm—James L. Clingan, Jr.

[57] ABSTRACT

A first processing system is coupled to a plurality of integrated circuits along a P bus. Each of these integrated circuits has a combination cache and memory management unit (MMU). The cache/MMU integrated circuits are also connected to a main memory via an M bus. A second processing system is also coupled to the main memory primarily via a secondary bus but also via the M bus. External TAGs coupled between the M bus and the secondary bus are used to maintain coherency between the first and second processing systems. Each external TAG corresponds to a particular cache/MMU integrated circuit and maintains information as to the status of its corresponding cache/MMU integrated circuit. The cache/MMU integrated circuit provides the necessary status information to its corresponding external TAG in a very efficient manner. Each cache/MMU integrated circuit can also be converted to a SRAM mode in which the cache performs like a conventional high speed static random access memory (SRAM). This ability to convert to a SRAM provides the first processing system with a very efficient scratch pad capability. Each cache/MMU integrated circuit also provides hit information external to the cache/MMU integrated circuit with respect to transactions on the P bus. This hit information is useful in determining system performance.

9 Claims, 3 Drawing Sheets

CACHE WHICH PROVIDES STATUS INFORMATION

CROSS-REFERENCE TO A RELATED APPLICATION

Related subject matter is disclosed in U.S. patent application Ser. No. 07/339,325 entitled "Dual SRAM/(Set Associative Cache)," by Yoav Talgam, Paul A. Reed, Elie Haddad, and James S. Golab, filed simultaneously herewith and assigned to the assignee hereof.

FIELD OF THE INVENTION

The invention relates to semiconductor caches, and more particularly, to caches for use in conjunction with a processor.

BACKGROUND OF THE INVENTION

The use of caches in conjunction with processors has been shown to be very effective in speeding up the rate that instructions are executed. The cache is a memory which is relatively small compared to main memory but which is very fast. The cache is used to provide very fast access to the instructions and/or data which are frequently used. There may or may not be separate caches for instructions (or code) and data. Whether the information is actually instructions or data, the information can be referred to as simply data. There has developed circuitry for keeping track of data which is contained in the cache. The common approach has been to use what is commonly known as TAGs as part of the cache to aid in identifying a request for data or an instruction which is contained in the cache. The processor submits a request for data or an instruction in the form of an address. The TAG is used to determine if the address generated by the processor is one for which the cache has the needed data. The TAG has TAG locations for storing TAG addresses for which information is contained in the cache. The address generated by the processor is compared to the TAG addresses. If the processor-generated address is also a TAG address, then the cache does have the requested data. When this occurs it is generally considered a "hit". When there is a miss in the cache, there is then an access to main memory. The information accessed from the main memory is returned to the processor and the cache stores this information in a data memory and the corresponding TAG address in a TAG location. Least recently used (LRU) logic determines which TAG location is the one that should be replaced by the most recent address which missed in the cache. The replaced TAG location is the one which the LRU logic determined was the least recently used TAG address.

A cache may have, in one extreme, completely fixed addresses which is known as a "direct-mapped" cache. If the TAG addresses are fixed, then there is no need to keep track of the least recently used TAG address because the TAG addresses are fixed. The information which corresponds to the TAG address is the only thing which can be updated. The determination of a hit on the TAG address is very simple because the TAG addresses are hard wired. In another extreme, any TAG location can have any address generated by the processor. In such a case, the determination of a TAG address hit requires reading all of the stored TAG addresses and performing a comparison of each of them with the address generated by the processor. This type of cache is known as a fully associative cache. There is a compromise approach in which certain of the TAG locations can have limited variability. There may be, for example, sets of four TAG locations in which each of the four TAG locations within a set has some bits in common and some that are variable. The common address bits (which comprise what is known as the "index") are thus hard-wired so that in response to an address generated by the processor, one set of four TAG locations is accessed. In such a case, the address generated by the processor can be considered to have an index portion and a TAG portion. The four TAG addresses present in the four TAG locations accessed by the index portion of the processor-generated address are read and compared to the TAG portion of the generated address. If one of the TAG addresses in the accessed TAG locations and the TAG portion of the generated address are the same, then there is a TAG hit. If the data which corresponds to the hit TAG location is valid, then the hit signal is generated and the information which corresponds to the hit TAG location is provided to the processor.

A cache provides a significant improvement in the performance of a processing system but there are number of potential needs. One potential need is for scratch pad operations. Another need is the ability to maintain coherency for the case in which the main memory is shared by a second processing system which accesses the main memory via a secondary bus. Another typical need is to have a memory management unit which translates between logical and physical addresses. It is desirable to achieve these functions as fast as possible while occupying as little board space as possible. Placing more functions on a single integrated circuit is one way of achieving reduced board space. Not all systems, however, require the same functions or in the same degree. For example, scratch pad needs can vary widely. A large number of systems will not have a second system accessing memory on a secondary bus. Thus, placing a large number of different functions on a single integrated circuit may result in a device which is very complex and thus too expensive for many applications. One way this can happen is to excessively proliferate the number of pinouts of the integrated circuit. Thus, there is needed an efficient way of providing different cache, scratch pad, coherency, and MMU related functions for a processing system.

SUMMARY OF THE INVENTION

Accordingly, it is an object of the present invention to provide an improved processing system.

It is another object of the present invention to provide an improved cache.

It is yet another object of the invention to provide an integrated circuit cache with improved use in providing coherency.

In carrying out these and other objects of the invention, there is provided, in one form, an integrated circuit having a processor bus, a memory bus, a TAG memory, a data memory, and a control circuit. The processor bus is for receiving a primary address and a primary word of data from a processor. The memory bus is for receiving or providing a secondary address, and receiving or providing a secondary word of data. The TAG memory, which is coupled to the processor bus, has a plurality of valid bits and a plurality of TAG locations for storing a plurality of TAG addresses. Each TAG location is characterized by a valid bit of the plurality of valid bits being associated therewith. The data memory, which is coupled to the processor bus, has a plurality of storage locations for storing data. The stored data may be invalid. Each storage location corresponds to a TAG location of the plurality of TAG locations and a valid bit of the plurality of valid bits for indicating if data stored in the storage location is invalid. The control circuit, which is coupled to the processor bus and the memory bus, provides a plurality of monitoring signals and a plurality of trace signals external to said cache and outputs a memory address onto said memory bus. The plurality of status signals indicate a particular state of a plurality of monitor states of the integrated circuit cache. The plurality of trace signals provide additional information as to the particular TAG location which is provided on the memory bus by the integrated circuit cache in addition to the TAG location information which is provided by the memory address.

Detailed Description of the Invention

Figure 1:
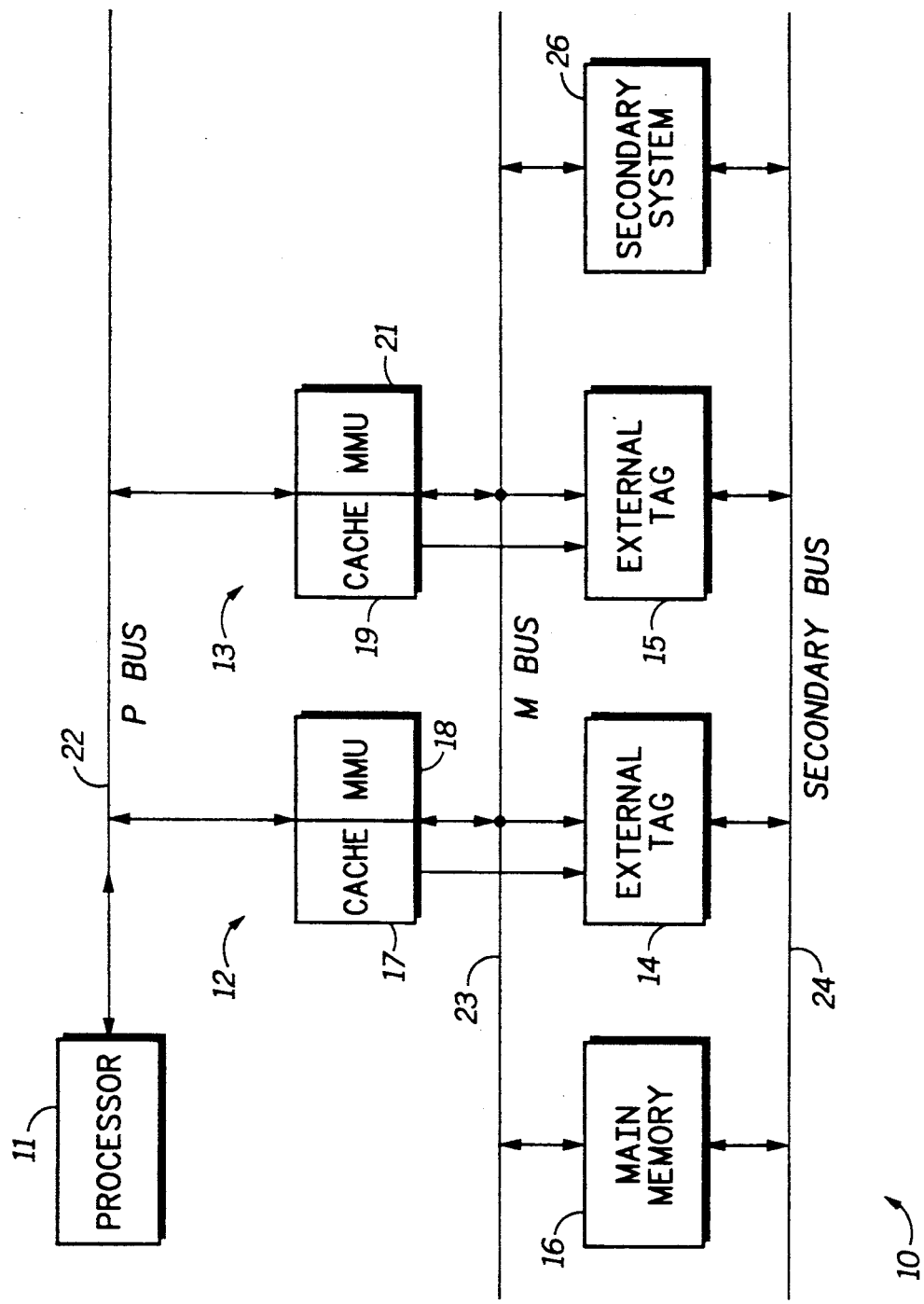
FIG. 1 is a block diagram of a computing system using caches and external TAGs according to a preferred embodiment of the invention.

Shown in FIG. 1 is a computing system 10 comprised of a processor 11, a cache/MMU 12, a cache/MMU 13, an external TAG 14, an external TAG 15, and a main memory 16. Cache/MMU 12 is a single integrated circuit which comprises a cache 17 and a memory management unit (MMU) 18. Cache/MMU 13 is a single integrated circuit which comprises a cache 19 and a memory management unit (MMU) 21. Processor 11 is coupled to cache/MMUs 12 and 13 by a P bus 22 for carrying data, addresses, and some control signals. P bus 22 comprises a 32 bit P data bus, a 32 bit P address bus, and control lines. Computing system 10 can have many more cache/MMUs coupled to P bus 22. Cache/MMUs 12 and 13 are also coupled to an M bus which is multiplexed so that the same 32 lines can carry either data or addresses. M bus 23 is also coupled to main memory 17. External TAGs 14 and 15 are coupled to M bus 23 and a secondary bus 24. Also shown in FIG. 1 is a secondary system 26 which is coupled to M bus 23 and secondary bus 24.

In operation processor 11 executes instructions using data. Main memory 17 contains the necessary instructions and data. The caches contain some instructions or some data, particularly the often used instructions and data. Processor 11, for example, sends an address out on P bus 22 and receives back data which was located at that address. If one of the caches, such as cache 17 or 19, has the data, the processor receives the instruction back in a single cycle from the cache which has the data. This is known as a hit. Each of the cache/MMUs has a particular chip select input so that it knows when it is being addressed by processor 11. If the data is not present in one of the caches, M bus 23 is used to obtain the data from main memory 16. This is known as a miss. The address for the data is provided onto M bus 23 by the cache which was identified by processor 11. Main memory 16 responds by sending back the data which is residing in the addressed location in main memory 17. The identified cache/MMU responds to the presence of the data on M bus 23 by providing the data to processor 11 via P bus 22. The identified cache also stores the data after a miss. MMUs 19 and 21 translate between logical addresses and physical addresses. Thus the address generated by processor 11 for a data request may not be the same address which is provided onto M bus 23 to obtain the data in the case of a cache miss. The address provided on M bus 23 would correspond to but may not be the same as the address on P bus 22. Processor 11 can also write to cache 12 and 13 which may require also writing to main memory.

The case of a write is now used to describe a simple example of maintaining coherency by the use of snooping. Processor 11 may write data to an address location but for reasons of optimizing the use of M bus 23, the data is written only into cache 17 so that the data resident in the corresponding address location in main memory 16 is different than it is for cache 17. The data in main memory 16 at that address location is thus invalid. The address location is a TAG in the cache. Such a TAG is then called "dirty". There is then an apparent incoherency between cache data and main memory data at this address. This apparent incoherency has been well recognized and solved, made coherent, by techniques known as snooping. The cache which has the dirty TAG identifies when that address appears on M bus 23 from another processing system such as system 26, i.e., snoops the bus, and takes control of M bus 23 in such a situation. Typically the cache which takes control then writes the valid data into main memory 16. Thus the cache which contains the dirty TAG snoops the M bus to make sure no harm is done to some other processing system accessing invalid data which resulted from the cache not updating the main memory. The snooping techniques can take advantage of the characteristic of the system that the updating of main memory 16 does not have to take place unless and until some other processing system needs it.

Secondary system 26 operates in much the same manner as system 10 except that secondary system 26 primarily uses secondary bus 24. Where main memory 16 is a major resource, it may be desirable to have two separate systems use it but on different buses. The coherency problem is much the same in the use of secondary system 26 as described before. Secondary system 26, in its various operations, may wish to change data in main memory 16. Cache 17, may however, also contain that data. If secondary system 26 writes into main memory 16 without also changing the cache data, or at least invalidating it, there would be an incoherency between the cache and main memory. A similar problem exists for system 26 attempting a read. If the location in main memory to be read is a dirty TAG in cache 17, system 26 would read invalid data. On the other hand if the access occurs along M bus 23, cache 17 would be informed by conventional snooping techniques so that cache 17 could respond accordingly, e.g., updating main memory or marking it as invalid. The purpose of the secondary bus is for primary use of the secondary system, i.e., to keep it off the M bus as much as possible. The approach shown in FIG. 1 for system 10 is to provide external TAGs 14 and 15 for snooping secondary bus 24 and informing secondary system 26 as to the status of caches 17 and 19 with respect to an address present on secondary bus 24.

External TAGs 14 and 15 are coupled to caches 17 and 18, respectively, not just via M bus 23, but also by control signals. Cache 17 keeps external TAG 14 updated as to which addresses have the corresponding data present in cache 17. Similarly, cache 19 keeps external TAG 15 updated as to which addresses have the corresponding data present in cache 19. Secondary system 26 can then be informed by external TAGs 14 and 15 using conventional snooping techniques if there is going to be a coherency problem if secondary system 26 accesses a particular location in main memory 16. Secondary system 26 then can stay on secondary bus 24 for its writing unless it is informed otherwise by external TAGs 14 and 15. This then can keep secondary system 26 off of M bus 23 a much larger percentage of the time than if external TAGs 14 and 15 did not provide the coherency information. Only if external TAGs 14 and 15 indicate there is a potential coherency problem, does secondary system 26 have to use M bus 23.

External TAGs 14 and 15 effectively duplicate TAGs of the corresponding caches 17 and 19, respectively. Caches 17 and 19 are each a portion of a single integrated circuit along with a MMU, MMUs 18 and 21, respectively. There are advantages to having the cache and MMU on the same integrated circuit. One simple advantage is that it reduces the number of integrated circuits which must be used in a system and thus reduces board space that is occupied for the two functions of cache and MMU. There are then fewer signals which are present on the board. To bring the external TAG function on-board the same integrated circuit as the cache/MMU would be difficult, not just because of the extra chip area required but also because of the increased number of pinouts. The connection to the secondary bus would add more than 32 pins to a chip that already has more than 170. There could also be a board-routing problem. Furthermore many systems do not have a secondary bus. Thus cache/MMUs 12 and 13 advantageously do not have the external TAG function on-board but rather provide the necessary signals for maintenance of an external TAG.

Another need met by cache/MMUs 12 and 13 is that of occasional scratch-pad type operations of processor 11. In a situation where a processor is doing scratch pad operations, the processor needs access to a memory which can be written to and read from very quickly. The amount of memory required can be quite a bit larger than a few words, otherwise internal processor may suffice, but significantly less than that of typical main memory. A static random access memory (SRAM) is known to be effective for this purpose. Cache/MMUs 12 and 13 are capable of switching to a mode not previously available, SRAM mode, in which they operate as SRAMs.

Figure 2:
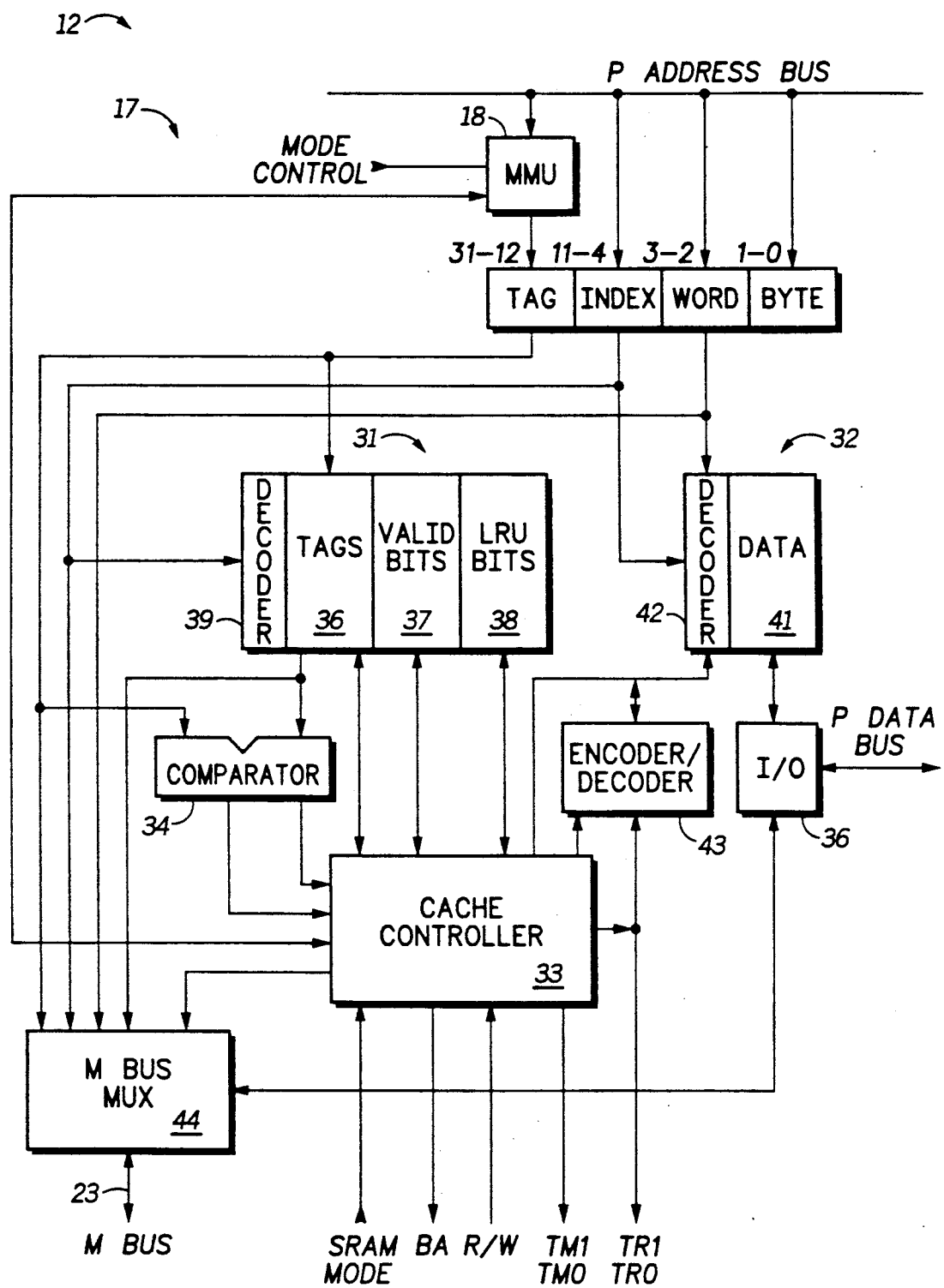
FIG. 2 is block diagram of a cache/MMU integrated circuit according to the preferred embodiment of the invention.

Shown in FIG. 2 is cache/MMU 12 divided into MMU 18 as a single operational block and cache 17 divided into various blocks. As shown in FIG. 2, cache 17 includes a TAG memory 31, a data memory 32, a cache controller 33, a comparator 34, and an I/O gate 36. TAG memory 31 comprises a TAG portion 36, a valid bits portion 37, an LRU portion 38, and a decoder 39. Data memory 32 comprises a data portion 41 and a decoder 42. Cache 17 further comprises an encoder/decoder 43 and an M bus multiplexer (MUX) 44. Cache 17 receives what is effectively a 32 bit address A31-A0, from the P address bus which is the address bus portion of the P bus. The 32-bit address is divided, functionally, into a 20-bit TAG (A31-A12), an 8-bit index (A11-A4), a 2-bit word select (A3-A2), and a 2-bit byte select (A1-A0). Byte selection is actually performed by four signals, each of which corresponds to a particular byte location in the 32 bit data word. Address A31-A12 received on the P address bus shown in FIG. 2 is translated as needed by MMU 18 from a logical address to a physical address. Thus the TAG address shown in FIG. 2 may not be exactly the same as that of the P address bus because MMU 18 performs the logical address to physical address translation. There would remain a correspondence between the TAG address and the P address bus but that correspondence might not be identity correspondence. This is conventional memory management operation.

Processor 11, via mode control signals received by MMU 18, indicates to cache 17 the particular mode that cache 17 is to enter. In the normal compare mode operation, decoder 39 selects four TAG locations in TAG portion 36 in response to the index. Each TAG location in TAG portion 36 has 20 bits which comprise the TAG address. Comparator 34 compares the TAG address in the four selected TAG locations to the TAG of address A31-A0 which are the 20 high order bits A31-A12. If one of the TAG addresses in the four selected TAG locations is the same as A31-A12, comparator 34 provides a TAG hit signal and information as to which TAG location was hit to cache controller 33. Associated with each TAG location are four 32-bit word locations in data memory 32. Decoder 42 receives the index as well as the 2-bit word select. The 2-bit word select determines which word within the four words associated with each TAG location may be the word of data requested by address A31-A2. This narrows the potential word selection to the words associated with four TAG locations. The TAG location is determined by comparator 34. The TAG location selection, if there is a TAG hit, is sent to data memory 32 from comparator 34 via chache controller 33. The word location in data portion 41 which is selected by the index, the word select, and the TAG comparison is coupled to I/O 36. Cache controller 33 also receives the valid bits associated with the four selected TAG locations and the information provided by comparator 34 as which TAG location was hit. The valid bits associated with the four selected TAG locations indicate which if any of the TAG locations have data stored in data memory 32 associated therewith which is valid. If the data in memory 32 which is associated with the hit TAG location is valid, cache controller communicates that to I/O 36. For a read operation, which is indicated by cache controller 33 receiving a read/write signal R/W in a first logic state, I/O 36 outputs onto the P data bus and to processor 11 the data present in the selected data location. This is the desired situation and the primary reason for which a cache exists. If cache 17 is in the write mode, I/O 36 writes the data present on the P data bus into the selected data location in data memory 32. Cache controller 33 also updates the LRU bits to reflect the fact that the hit TAG location is now the most recently used TAG location.

In the case where comparator 34 determines that there is a miss in the cache, one of the TAG locations of the four TAG locations selected by the index is loaded with TAG A31-A12 and the corresponding four data locations are loaded with data from main memory 16. In the case of a write when there is a hit, the loading of the hit TAG location and the selected one data location of the possible four corresponding data locations occurs in one cycle. The primary difference between a hit and a miss in a write is that in a miss a TAG location is loaded with the new TAG address and all four of the corresponding data locations are loaded with data instead of just one data location. In the case of a miss, the selection of the TAG location of the four indexed TAG locations is based on the status of the LRU bits so that the data locations which are written correspond to the TAG location which was least recently used. The LRU bits associated with the four indexed TAG locations selected by the index indicate which of the TAG locations was least recently used. If the data to be written is present on the P data bus, cache controller 33 then provides the TAG location information to data memory 32 so that the corresponding data location is coupled to I/O 36 which drives the data which is present on the P data bus into the selected word location.

In the case where the address received on the P address bus is for requested data which is not present and which thus causes a miss in cache 17, the data must be obtained from main memory. This can take quite a number of cycles before the data is provided back to processor 11 on the P data bus. The request for the data from main memory is made via M bus 23 which is coupled to MUX 44. The full address A31-A2 which missed in the cache is output on M bus 23 and a data word is received back on M bus 23 by MUX 44 which couples it to I/O 36. From I/O 36, the data word is provided onto the P data bus where it is sent back to processor 11 in FIG. 1 and stored in the data memory 32. This must be done for all four permutations of A3-A2 because each TAG has all four of these permutations associated therewith. Thus four addresses are output on M bus 23 and four words are received back.

There is another conventional mode of operation called cache inhibit mode in which cache 11 acts simply as a conduit, but still including the requisite data translation, between P bus 22 and M bus 23. This is useful, for example, if processor 11 is to directly access main memory 16. MMU 18 receives the cache inhibit signal and so indicates to cache controller 33. In the cache inhibit mode processor 11 can either read from main memory or write to main memory. In either case, the address present on the P address, appropriately translated, is first coupled to the M bus 23 via MUX 44. In the read mode, data is then presented on M bus 23 by the main memory which is coupled to P data bus by cache 17 via MUX 44 and I/O 36 under the control of cache controller 23. For the write mode, subsequent to the main memory receiving the address, cache 17 provides the data to be written into the addressed location in main memory to M bus 23 from the P data bus via I/O 36 and MUX 44 under the control of cache controller 33.

These compare and inhibit modes described for cache 17 are known in the art. Cache 17, however, provides information, via external pins, not previously available from an integrated circuit cache/MMU in these modes. Signals TM1,TM0 provide information external to integrated circuit cache MMU 12 which is useful to an external TAG such as external TAG 15. For the case when cache 17 is performing a read via M bus 23, which may be the result of a miss in the cache, cache controller 33 provides signal TM1 at a logic low and TM0 at a logic low to indicate that the TAG portion of the address which is on M bus 33 has been loaded into TAGS 36 into the location which is indicated by the index portion of the address. There are four TAG locations for each index so that the TAG portion of the address does not completely define the TAG location. The one of four TAG selection is based on the least recently used criterion. This information is provided to data memory 32 via cache controller 33 as four decoded signals, only one of which is active. Encoder/decoder 43 performs an encode, under the control of cache controller 33, on these four decoded signals to output two encoded signals TR1,TR0 which are provided externally on pins of cache/MMU 12. There is then externally provided, by a combination of the address on M bus 33 and signals TR1,TR0 sufficient information to define the precise TAG location of cache 17 which has been loaded. Bus acknowledge signal BA, which is provided externally on a pin of cache/MMU 12 from cache controller 33, indicates, when active, that cache/MMU is active on M bus 23. External TAG 14 receives signal BA, signals TR1,TR0, and signals TM1,TM0 from cache 17. Since TAG 14 is also coupled to M bus 23, TAG 14 has all of the information necessary to duplicate the TAG status of cache 17. Another situation when signal TM1 is a logic low and signal TM0 is a logic high is when cache 17 is writing to main memory as a result of processor 11 writing into cache 17 in which case TAG locations in TAGS 36 are also written into. The same necessary information is provided externally to cache/MMU 12 so that external TAG 14 can duplicate TAGS 36.

For the case in which cache 17 is in the cache inhibit mode, signals TM1,TM0 are both a logic low. In such a case TAGS 36 is unchanged because the processor is simply using cache 17 as a conduit to main memory. Accordingly, the status of the external TAG should also remain unchanged. Thus external TAG 14 knows to not change its TAG status by virtue of receiving both signals TM1,TM0 at a logic low.

Another case which can occur for cache 17 is for writing to main memory and also invalidating the TAG location in TAGS 36 which corresponds to the written data. This action, writing a data location into main memory and simultaneously marking the corresponding TAG location as invalid, is known as flushing. For a flush the data being written into main memory is itself valid but it is not going to be maintained in cache 17 any longer. Thus, external TAG 14 needs to know to invalidate the TAG location. For this case in which the TAG location is being invalidated, signals TM1,TM0 are both a logic low. The TAG location information is provided by the TAG and index portions of the address present on M bus 23 and signals TR1,TR0. The information that the TAG location is invalid is provided by signals TM1,TM0. The information that the address on M bus 23 applies to cache 17 is provided by signal BA.

The SRAM mode of cache 17 is entered by an external SRAM mode signal being active. In the SRAM mode cache 17 operates as a static random access memory (SRAM). The address is comprised of signals A11-A2 from the P address bus and signals TR1 and TR0. Signals TR1,TR0 become externally provided inputs to cache/MMU 12 in the SRAM mode. Signals TR1,TR0 are otherwise outputs. For the three conditions of signals TM1,TM0 described previously, signals TR1,TR0 provide TAG location information. In the SRAM mode encoder/decoder 43 operates as a decoder under the control of cache controller 33. Encoder/decoder 43 decodes the two bit binary input of signals TR1,TR0 to four signals, one of which is active, and provides these four signals to data memory 32. These four signals are applied to data memory in the same manner as the four signals generated as a result of the compare performed by comparator 34 when there is a TAG hit. The word in data memory is thus located in response to address signals A11-A2 and signals TR1,TR0. The data is either written into the selected word location in data memory 32 from the P data bus via I/O 36 or is output from the selected word location of data memory 32 onto the P data bus via I/O 36.

In the SRAM mode cache controller 33 disables comparator 34 and TAG memory 31. In the preferred embodiment, the contents of TAG memory 31 do not vary while cache 17 is in the SRAM mode. Another alternative would be to flush cache or invalidate all of the TAGs upon receiving the SRAM mode signal in the active state. One advantage of not automatically altering the TAGs to some predetermined state, is that the processor may use a limited address space of data memory 32 so that the TAGs which corresponded to data location outside this limited address space could remain valid. In the present embodiment, processor 11 can prepare for entry into the SRAM mode, by flushing certain TAG locations, particularly those which are "dirty". If there is an external TAG in use it may also be desirable to flush all of the TAG locations which are valid. The external TAG would then know to invalidate the TAGs corresponding to those flushed locations.

The three conditions of TM1,TM0 previously described provide information which provides for the opportunity to utilize an external TAG such as external TAG 14. There is a fourth condition of TM1,TM0 which is useful in cache 17 more useful information. For the case in which TM1 is a logic high and TM0 is a logic low, signals TR1,TR0 output "hit" information for P bus transactions. For this condition of signals TM1,TM0, signal TR1 at a logic high indicates there is a hit in MMU 18 and signal TR0 at a logic high indicates that there is a hit in cache 17. As is typical of MMUs in the art, MMU 18 has a translation look-aside buffer which may hit or miss. By providing this information externally, a user can conveniently monitor the hit ratio, which is the primary performance measurement of a cache, of cache 17 as well MMU 18.

Figure 3:
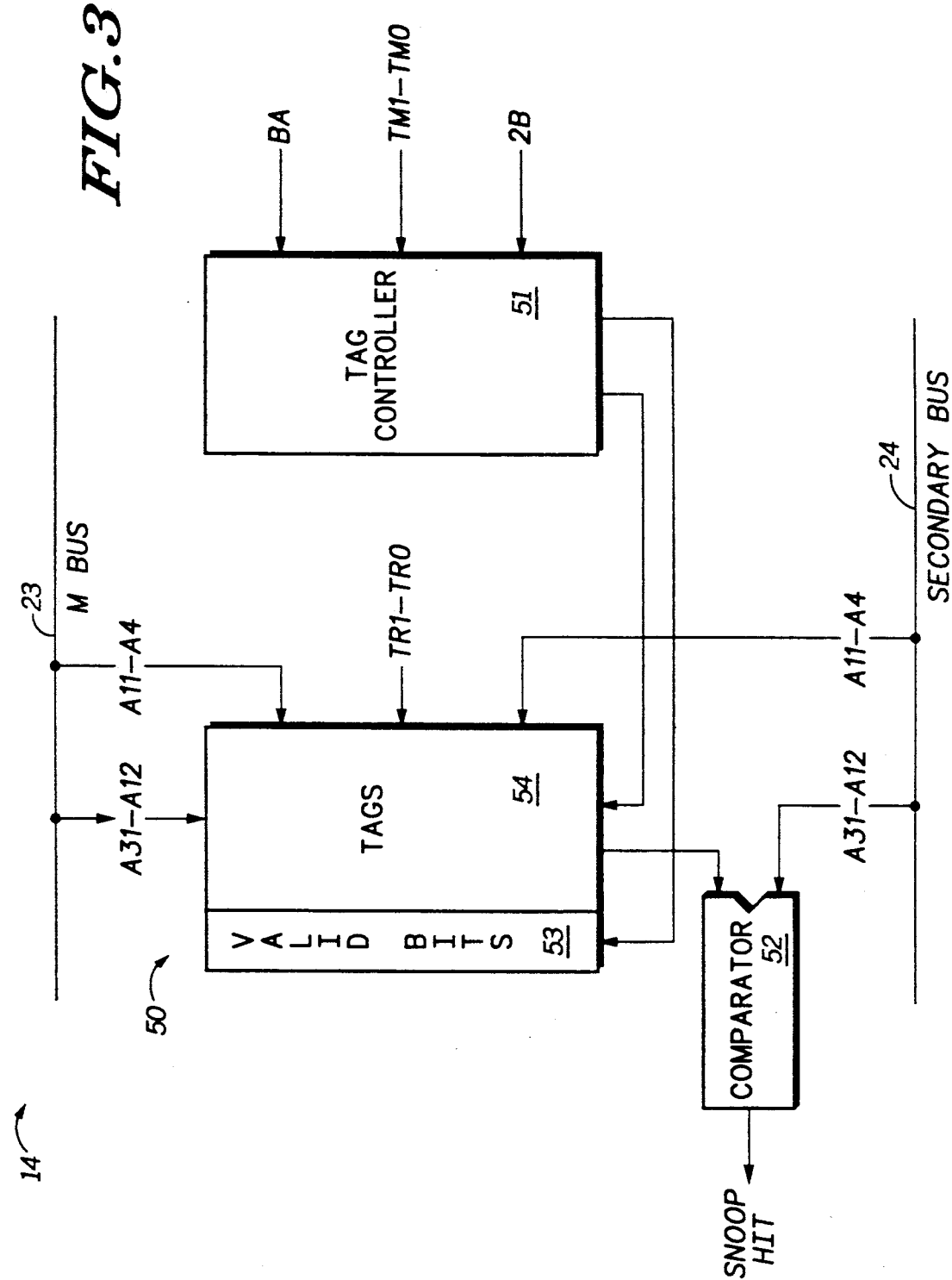
FIG. 3 is a block diagram of an external TAG according to the preferred embodiment of the invention.

Shown in FIG. 3 is external TAG 14 comprised of TAG memory 50, a TAG controller 51, and a comparator 52. TAG memory 50 comprises a valid bits portion 53 and a TAGS 54. Valid bits portion 53 and TAGS 54 are duplicates of TAGS 36 and valid bits 37 of TAG memory 31 of cache 17 shown in FIG. 2. Signals BA and TM1,TM0 control the operation external TAG 14 with respect to M bus 23. When signal BA is active, signal TM1 is a logic low, and signal TM0 is a logic high, TAGS 54 is loaded with a TAG, which is the state of signals A31-A12, at the TAG location indicated by address signals A11-A4 on M bus 23 and signals TR1,TR0 under the control of TAG controller 51. The valid bit which corresponds to the loaded TAG location is marked valid. When signal BA is active and signals TM1,TM0 are both a logic low, the valid bit which corresponds to the TAG location indicated by address signals A11-A4 and signals TR1,TR0 is marked invalid. External TAG 14 is non-responsive to the signals on M bus 23 for any other combination of signals BA and TM1,TM0. For example, if BA is inactive, external TAGs 14 is non-responsive to M bus 23. If signals TM1,TM0 are both a logic high, external TAG 14 is non-responsive to M bus 23. If signal TM1 is a logic high and signal TM0 is a logic low, external TAG 14 is non-responsive to M bus 23.

External TAG 14 is responsive to secondary bus 24 if TAG controller 51 receives an externally provided secondary bus active signal 2B in an active state. Signal 2B is provided by secondary system 26 to activate the snooping activity of external TAG 14. External TAG 14 snoops secondary bus by outputting the four TAGs indexed by signals A11-A4 to comparator in the same manner that TAGS 36 provides four TAGS to comparator 34 in cache 17 in FIG. 2. Comparator 52 also receives address signals A31-A12 on secondary bus 24 and compares them to the four TAGs indexed by signals A11-A4 on secondary bus 24. If one of the four TAGs is the same as signals A31-A12 on secondary bus 24, comparator 52 provides a snoop hit signal for use external to external TAG 14. This snoop hit signal is useful to secondary system 26 for determining if one of the caches in system 10 has the data for the address on secondary bus 24. If secondary system 26 desires to access such a location in main memory, a coherency problem could arise. Secondary system 26 thus has the information necessary to maintain coherency.

While the invention has been described in a specific embodiment, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

We claim:

1. An integrated circuit cache, having an address bus for receiving processor addresses from a processor, a data bus for providing requested data to the processor, and a multiplexed bus for accessing a main memory using memory addresses, said processor addresses and said memory addresses having a TAG portion and an index portion, comprising:

a TAG memory, coupled to the address bus, having a plurality of valid bits and a plurality of TAG locations for storing a plurality of TAG addresses, each TAG location having a valid bit of the plurality of valid bits associated therewith, said TAG locations characterized as being arranged in sets of TAG locations, each set of TAG locations corresponding to a particular index portion;

a data memory, coupled to the address bus, having a plurality of storage locations for storing data, wherein said stored data may be invalid, each storage location corresponding to a TAG location of the plurality of TAG locations, and to a valid bit of said plurality of valid bits for indicating if data stored in the storage location is invalid;

determination means, coupled to the TAG memory and to the address bus, for determining if the TAG portion of the processor address present on the address bus corresponds to a TAG address present in the selected set of TAG locations which correspond to the index portion of the processor address and providing a TAG select signal to the data memory to indicate which one of the TAG locations of the selected set of TAG locations contains the TAG portion of the processor address;

output means, coupled to the TAG memory, for providing, onto the multiplexed bus, the memory address with the TAG portion having the TAG address of one of the TAG locations of the set of TAG locations which corresponds to the index portion of the memory address; and cache controller means, coupled to the output means, for providing a plurality of trace signals and status signals external to said cache integrated circuit, said plurality of status signals indicating if the valid bit which corresponds to the TAG location of the TAG address which is provided on the memory bus is set, and said trace signals indicating which one of the TAG locations of the set of TAG locations corresponding to the index portion of the memory address on the memory address has its TAG address on the multiplexed bus; and wherein said integrated circuit cache has a plurality of monitor states which comprise:
a first state, in which said integrated circuit cache performs a memory cycle on the multiplexed bus for which an address TAG is being validated;
a second state, in which said integrated circuit cache performs a memory cycle on the multiplexed bus for which an address TAG is being invalidated; and
a third state, in which said integrated circuit cache performs a memory cycle on the multiplexed bus for which an address TAG is not affected.

2. The integrated circuit cache of claim 1 wherein said plurality of status signals consists of a first status signal and a second status signal.

3. The integrated circuit cache of claim 1 wherein said plurality of monitor states further comprises a fourth state indicated by said status signals, said fourth state characterized by the integrated circuit cache determining if there is valid data for the processor address, wherein one of said plurality of trace bits indicates if the cache contains valid data for the processor address when said status signals are in the fourth state.

4. A cache having an address bus for receiving addresses from a processor requesting data, a data bus for providing requested data to the processor, and a multiplexed bus for being coupled to a main memory, comprising:
a TAG memory, coupled to the address bus, having a plurality of valid bits and a plurality of TAG locations for storing a plurality of TAG addresses, each TAG location having a valid bit of the plurality of valid bits associated therewith;
a data memory, coupled to the data bus, having a plurality of storage locations for storing data, wherein said stored data may be invalid, each storage location corresponding to a TAG location of the plurality of TAG locations and a valid bit of the plurality of valid bits for indicating if data stored in the storage location is invalid;
control means, coupled to the TAG memory and to the data memory, for providing a plurality of monitoring signals and a plurality of trace signals external to said cache, said plurality of monitoring signals corresponding to a state of a plurality of monitor state, said plurality of trace signals responsive to a portion of an address on the multiplexed bus;

wherein said plurality of monitor states comprises:
a first state, in which said cache performs a memory cycle on the multiplexed bus for which an address TAG is being validated;
a second state, in which said cache performs a memory cycle on the multiplexed bus for which an address TAG is being invalidated; and
a third state, in which said cache performs a memory cycle on the multiplexed bus for which an address TAG is not affected.

5. The integrated circuit cache of claim 4 wherein said plurality of monitor bits consists of a first monitor bit and a second monitor bit.

6. The cache of claim 4 wherein said plurality of monitor states further comprises a fourth state, in which said cache receives an address on the address bus, wherein one of said plurality of trace bits indicates whether the cache can supply the data requested by the processor.

7. A cache comprising:
a primary bus for receiving a primary address and a primary word of data from a processor;
a secondary bus for receiving or providing a secondary address, and receiving or providing a secondary word of data;
a TAG memory, coupled to the primary bus, having a plurality of valid bits, and a plurality of TAG locations for storing a plurality of TAG addresses, each TAG location having a valid bit of the plurality of valid bits associated therewith;
a data memory, coupled to the primary bus, having a plurality of storage locations for storing data, wherein said stored data may be invalid, each storage location corresponding to a TAG location of the plurality of TAG locations and a valid bit of the plurality of valid bits for indicating if data stored in the storage location is invalid;
control means, coupled to the primary bus and the secondary bus, for providing a plurality of monitoring signals and a plurality of trace signals external to said cache, said plurality of monitoring signals corresponding to a state of a plurality of monitor states, said plurality of trace signals responsive to a portion of an address provided by the cache on the secondary bus;

wherein said plurality of monitor states comprises:
a first state, in which said cache performs a memory cycle on the multiplexed bus for which an address TAG is being validated;
a second state, in which said cache performs a memory cycle on the multiplexed bus for which an address TAG is being invalidated; and
a third state, in which said cache performs a memory cycle on the multiplexed bus for which an address TAG is not affected.

8. The integrated circuit cache of claim 5 wherein said plurality of monitor bits consists of a first monitor bit and a second monitor bit.

9. The cache of claim 5 wherein said plurality of monitor states further comprises a fourth state, in which said cache receives an address on the address bus, wherein one of said plurality of trace bits indicates whether the cache can supply the data requested by the processor.

* * * * *

UNITED STATES PATENT AND TRADEMARK OFFICE
CERTIFICATE OF CORRECTION

PATENT NO. : 5,067,078

DATED : November 19, 1991

INVENTOR(S) : Yoav Talgam et al

It is certified that error appears in the above-identified patent and that said Letters Patent is hereby corrected as shown below:

Column 11, Line 62, change "state" to --states--.
Column 12, Line 55, change "5" to --7--.
Column 12, Line 58, change "5" to --7--.

Signed and Sealed this

Second Day of March, 1993

Attest:

STEPHEN G. KUNIN

Attesting Officer

Acting Commissioner of Patents and Trademarks